United States Patent
Aggarwal et al.

(10) Patent No.: US 11,556,773 B1
(45) Date of Patent: Jan. 17, 2023

(54) MACHINE LEARNING ANALYSIS OF INCREMENTAL EVENT CAUSALITY TOWARDS A TARGET OUTCOME

(71) Applicant: Amazon Technologies, Inc., Seattle, WA (US)

(72) Inventors: Shikha Aggarwal, Seattle, WA (US); Nikolaos Chatzipanagiotis, Seattle, WA (US); Shivani Matta, Redmond, WA (US); Pragyana K. Mishra, Seattle, WA (US); Anil Padia, Redmond, WA (US); Nikhil Raina, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1019 days.

(21) Appl. No.: 16/024,434

(22) Filed: Jun. 29, 2018

(51) Int. Cl.
*G06N 3/08* (2006.01)
*G06N 7/00* (2006.01)

(52) U.S. Cl.
CPC .............. *G06N 3/08* (2013.01); *G06N 7/005* (2013.01)

(58) Field of Classification Search
CPC .................................. G06N 3/08; G06N 7/005
See application file for complete search history.

(56) References Cited

U.S. PATENT DOCUMENTS

| 7,765,130 | B2 | 7/2010 | McQueen, III |
| 7,966,334 | B1 | 6/2011 | Bezos |
| 8,965,998 | B1 | 2/2015 | Dicker |
| 10,963,808 | B1* | 3/2021 | Kumari ................ G06N 7/005 |
| 2018/0197090 | A1* | 7/2018 | Yates .................... G06Q 50/01 |
| 2018/0316707 | A1* | 11/2018 | Dodson ............... H04L 41/145 |
| 2019/0147231 | A1* | 5/2019 | Kim ..................... G06N 3/0445 |
| | | | 382/181 |

OTHER PUBLICATIONS

Chan, David, et al. "Evaluating online ad campaigns in a pipeline: causal models at scale." Proceedings of the 16th ACM SIGKDD international conference on Knowledge discovery and data mining. 2010. https://dl.acm.org/doi/pdf/10.1145/1835804.1835809 (Year: 2010).*

Bottou, Léon, et al. "Counterfactual Reasoning and Learning Systems: The Example of Computational Advertising." Journal of Machine Learning Research 14.11 (2013). https://www.jmlr.org/papers/volume14/bottou13a/bottou13a.pdf (Year: 2013).*

(Continued)

*Primary Examiner* — Kakali Chaki
*Assistant Examiner* — Michael H Hoang
(74) *Attorney, Agent, or Firm* — Knobbe, Martens, Olson & Bear, LLP

(57) ABSTRACT

Aspects of the present disclosure relate to machine learning techniques for identifying the incremental impact of different past events on the likelihood that a target outcome will occur. The technology can use a recurrent neural network to analyze two different representations of an event sequence—one in which some particular event occurs, and another in which that particular event does not occur. The incremental impact of that particular event can be determined based on the calculated difference between the probabilities of the target outcome occurring after these two sequences.

19 Claims, 9 Drawing Sheets

(56) References Cited

OTHER PUBLICATIONS

Lawrence, Carolin, Artem Sokolov, and Stefan Riezler. "Counterfactual learning from bandit feedback under deterministic logging: A case study in statistical machine translation." arXiv preprint arXiv:1707.09118 (2017). https://arxiv.org/pdf/1707.09118.pdf (Year: 2017).*

Schulam, Peter, and Suchi Saria. "Reliable decision support using counterfactual models." Advances in neural information processing systems 30 (2017). https://proceedings.neurips.cc/paper/2017/file/299a23a2291e2126b91d54f3601ec162-Paper.pdf (Year: 2017).*

* cited by examiner

US 11,556,773 B1

MACHINE LEARNING ANALYSIS OF INCREMENTAL EVENT CAUSALITY TOWARDS A TARGET OUTCOME

BACKGROUND

Artificial intelligence describes computerized systems that can perform tasks typically considered to require human intelligence. The capability to learn is an important aspect of intelligence, as a system without this capability generally cannot become more intelligent from experience. Machine learning is a field of computer science that gives computers the ability to learn without being explicitly programmed, for example enabling artificial intelligence systems to learn complex tasks or adapt to changing environments.

BRIEF DESCRIPTION OF THE DRAWINGS

Specific embodiments and inventive features will now be described with reference to the drawings, which are provided for purposes of illustration, and not limitation. Throughout the drawings, reference numbers may be re-used to indicate correspondence between referenced elements.

DETAILED DESCRIPTION

Figure 1A:
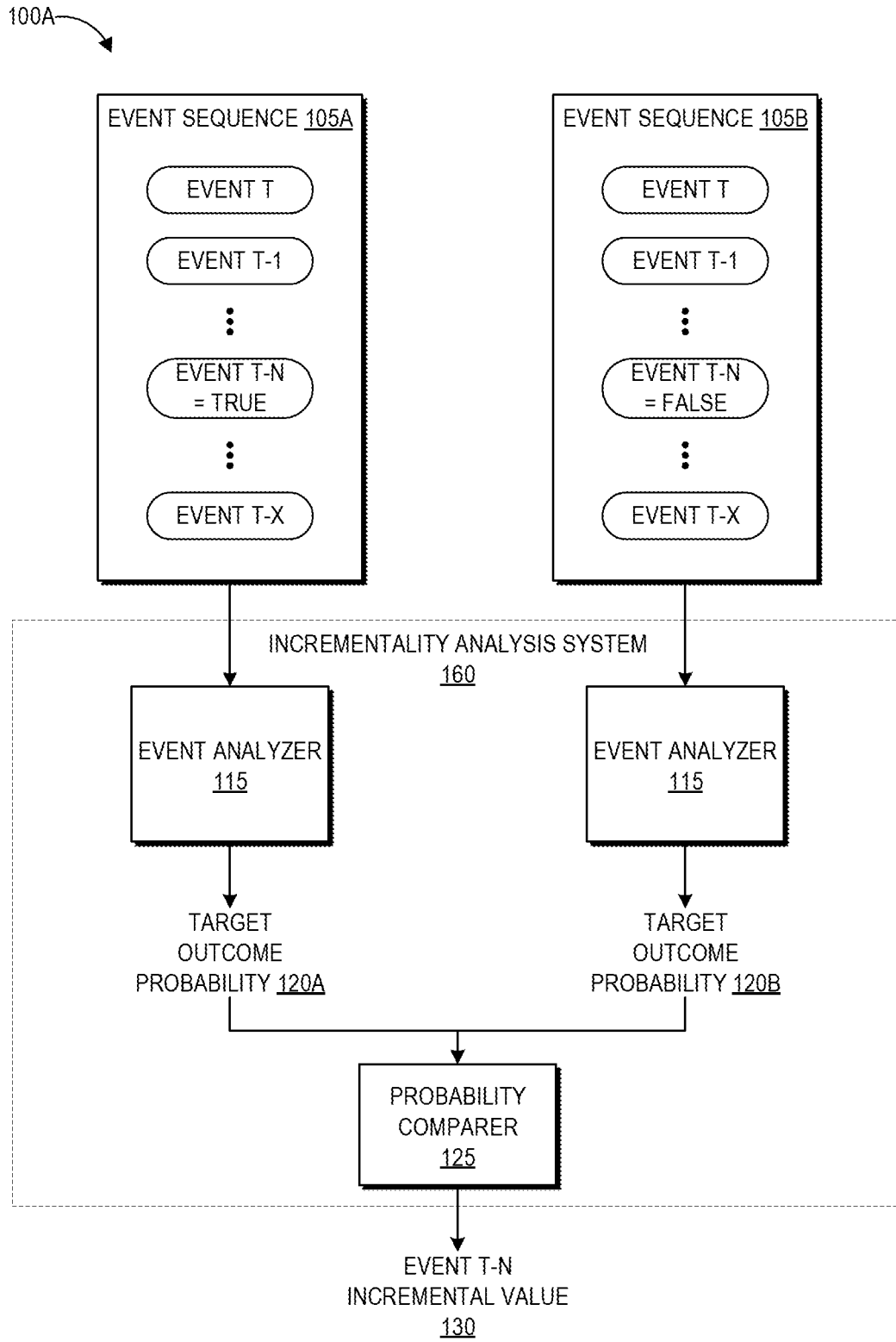
FIG. 1A is a schematic diagram of an embodiment of a machine learning sequence analysis system for evaluating the incremental impact of a past event in a chain of events, according to the present disclosure.

The present disclosure is generally directed to using artificial intelligence or machine learning systems to determine the incremental impact of particular events in a chain of events leading up to a target outcome. Causality is the concept that certain events can cause a particular outcome to occur or not occur. A particular outcome can be caused by multiple events leading up to the outcome. Some events may be contributory causes (e.g., one amongst several co-occurrent causes), necessary causes (e.g., outcome O would not occur without event A, but will not definitively occur because event A did occur), or sufficient causes (e.g., outcome O will occur if event B occurs). However, it is generally difficult or impossible to specify the particular level of causal contribution, the "incremental impact," of any given event. The disclosed machine learning systems address these challenges, among others, by modeling the individual influence of particular events in a sequence on an outcome of the sequence. The disclosed machine learning sequence analysis can be applied to determine the incremental impact of a past event in a sequence in order to understand its overall influence on an outcome, as well as to determine which of a number of potential future events is more likely to yield the desired outcome.

Some implementations of the disclosed technology can be used to analyze the incremental impact of certain events, such as user impressions of marketing content, leading to user taking a desired action in an electronic marketplace environment. A desired action can be considered as a high value action such as a purchase, rental, registry or wish list creation, membership subscription, or program sign-up, to name a few examples. Marketing content can include articles, videos, blogs, or other forms of promotional materials. By determining the incremental value of a particular piece of marketing content, it can be possible to establish pricing for the marketing content commensurate with its actual performance, and to rank marketing content relative to one another for use in selecting certain marketing content over others in order to optimize the likelihood of a target outcome occurrence.

For instance, in order to determine a pricing structure for its marketing programs, a manager of the electronic marketplace may wish to assess their value, with such value including the number of desired actions for which a given marketing program is responsible. One current way of generating such an assessment is a web lab, however this is a costly solution that shuts down certain marketing programs for a portion of users in order to measure their impact on desired actions. Further, there are often multiple events in a user's path to perform a desired action, some of which may be caused by other events that preceded them. For example, renting a movie that is included in a certain subscription plan can increase the propensity of the user to subscribe to that subscription plan, which subsequently increases downstream conversion probabilities. A user can find their way to the electronic marketplace via many different traffic channels, including directly navigating to the electronic marketplace, searching for an item and being directed to the electronic marketplace, or being directed to the electronic marketplace from an advertisement. Once at the electronic marketplace, the user may make many clicks, perform searches, browse item selections, watch videos, read and write item reviews, and have "impressions" of marketing content before performing a desired action. Impressions refer to user exposures to certain marketing content, for example by seeing or hearing advertisements without necessarily taking any action. On the other hand, a "hit" can refer to an impression that also involves user interaction with the marketing content, for example a user clicking on a navigational link of the marketing content. The complexity and inter-dependence of this sequence of events is part of what makes it difficult to ascertain the level of impact any given one of the events has on a later-occurring target outcome.

The disclosed machine learning systems can isolate the causality score of a given event in such a sequence, for example quantifying the incremental impact of certain marketing programs for use in establishing pricing. The incremental impact can be considered as the change in likelihood of a user performing a desired action (or of some other target outcome occurring) that is attributable to occurrence of a particular event (e.g., a marketing touch). There are several factors which can complicate measurement of incremental impact. For example, many background factors that have not been observed in the event sequence may influence the target outcome. In some embodiments, analyzing the incremental impact of a particular event across a large number of users (e.g., hundreds, thousands, or millions) can control for the bias due to background factors to get a more accurate estimate of the overall incremental impact of that event. In the context of an electronic catalog, such events can include user impressions of particular marketing programs, and user redirections to the electronic catalog from certain "offsite" traffic channels (e.g., web sites, applications, or other advertising hosts that may have separate domains from the electronic catalog). These offsite traffic channels may present offsite advertisements for particular items of the electronic catalog, including navigational shortcuts to a page of the electronic catalog that presents information about that particular item (an "item detail page"). This is referred to herein as an "associate traffic channel." Events can also include user actions such as searches, item detail pages viewed, item purchases, item rentals, digital content streaming and/or downloading, and reviews/articles read, to name a few examples.

An additional complication can arise due to the sequential nature of events in the analyzed sequence. For example, suppose an electronic catalog user is directed to an item detail page from an associate traffic channel. Thereafter, the user uses a search function of the electronic catalog to find similar items to that particular item, viewing additional item detail pages. Subsequently, the user receives an electronic message with a reminder to re-visit the last item detail page she viewed. A navigational shortcut in the electronic message directs the user back to that detail page, where the user reads some customer reviews and embedded articles about the item, watches a pertinent embedded video, and finally makes a purchase. In this scenario, the user's propensity to buy the item was initially influenced by the associate traffic channel that lead her to the electronic catalog, and was subsequently further affected by a reminder message, as well as the various catalog functions (search, reviews, embedded articles, and videos). The disclosed machine learning sequence analysis makes it possible to estimate the incremental impact of individual ones of these influencing events on the end outcome of the user purchasing the item.

The disclosed machine learning sequence analysis can include featurization of the events in a sequence. Featurization refers to the description of data with a numerical value that encodes its meaning and/or properties. The featurized event data can be input into an artificial neural network, for example a sequence analysis architecture such as a recurrent neural network ("RNN"). RNNs, for example long-term short-memory neural networks ("LTSMs") and gated recurrent unit neural networks ("GRUs") have emerged as powerful models for learning from sequence data. The disclosed machine learning system can implement an RNN to analyze the featurized event sequences and output a probabilistic value representing a likelihood of some target outcome occurring. RNNs are generative models, which allows the disclosed techniques to simulate counter-factual outcomes (e.g., sequences that did not actually occur or that have not yet occurred).

For example, the featurization of a particular event can be modified to represent both that it did occur and that it did not occur. Two versions of the sequence of events, one with the "did-occur" featurization of that particular event and another with the "did-not-occur" featurization, can be separately input into the RNN. The resulting probabilities of the target outcome occurrence can be compared to isolate the incremental impact of that particular event on the target outcome. As another example, by substituting multiple options for one another in an event sequence and comparing the resulting probabilities of the target outcome occurring, the disclosed machine learning techniques can determine the event sequence that yields the highest probability of the target outcome. This can enable, for example, selection of a marketing program that is most likely to cause a user to perform a desired action.

As would be appreciated by one of skill in the art, the use of the disclosed machine learning techniques represents a significant technological advance over prior implementations. Specifically, the disclosed machine learning sequence analysis provides insight into the incremental impact of a particular event in a sequence on a target outcome, which can be used to quantify the added value and assess the effectiveness of that particular event. For example, disclosed techniques enable counter-factual simulation to evaluate the incremental impact of an individual event. Further, the disclosed machine learning sequence analysis can determine the incremental impact of an event on the target outcome even when there are intervening, unrelated events. In addition, the disclosed machine learning sequence analysis can be applied on a large scale, for example processing hundreds of millions of hits and impressions each day. Moreover, the disclosed machine learning sequence analysis can be applied in real time to select events from among possible options, for example to make decisions about what content to expose to users as users are navigating the electronic catalog. As such, the embodiments described herein represent significant improvements in computer-related technology.

As used herein, an event sequence includes some number of events (happenings, actions, etc.) in a chronological order. The events may be successive (e.g., occurring one after the other) or there may be intervening events not captured in the event sequence. A sequence may include a number of the same type of event, such as multiple transits of a user to an electronic catalog, or the sequence may include a number of different events.

The present disclosure presents examples in the context of analyzing the incremental impact of events, for example marketing touches, leading up to a high value action in an electronic marketplace environment. It will be appreciated that implementations of the disclosed artificially intelligent causality analysis system can be used to identify the incremental impact of other types of events leading up to other types of outcomes (desired or undesired), for example events leading to certain health conditions, events leading to certain desired achievements or goals, or events leading to certain unwanted consequences. Various aspects of the disclosure will now be described with regard to certain examples and embodiments, which are intended to illustrate but not limit the disclosure. Although the examples and embodiments described herein will focus, for the purpose of illustration, specific calculations and algorithms, one of skill in the art will appreciate the examples are illustrative only and are not intended to be limiting.

Overview of Example Machine Learning Systems

FIG. 1A is a schematic diagram of an embodiment of a machine learning sequence analysis system 100A for evaluating the incremental impact of a past event in a chain of events, according to the present disclosure. As illustrated, the disclosed techniques can be used to analyze event sequence 105A and event sequence 105B. These event sequences 105A, 105B include common events T, T−1, T−N, and T−X, possibly among others. However, the event sequences 105A, 105B differ in that event sequence 105A models event T−N as having actually occurred ("event T−N=true") and that event sequence 105B models event T−N as having not occurred ("event T−N=false"). One of these event sequences may be factual (e.g., corresponding to a real chain of events) while the other is counter-factual (e.g., differing from the real chain of events).

These two event sequences 105A, 105B can be input into an event analyzer 115 trained to predict the likelihood of a target outcome from the sequence. The target outcome refers to the event about which the event analyzer 115 is trained to make probability predictions. As described herein, the sequence can be featurized and this feature representation provided as input to the event analyzer 115. Providing the first event sequence 105A to the event analyzer 115 yields a first target outcome probability 120A, while providing the second event sequence 105B to the event analyzer 115 yields a second target outcome probability 120B. The difference between these target outcome probabilities 120A, 120B, which are based upon sequences that differ only with respect to the occurrence or non-occurrence of event T−N, reflects the incremental value of event T−N to a target outcome. As such, the probability comparer 125 can compute the incremental value 120 of event T−N as the difference between the target outcome probabilities 120A, 120B. Together, the two instances of the event analyzer 115 and the probability comparer 125 form an incrementality analysis system 160.

Specifically, the probability comparer may subtract probability 120B, which reflects the non-occurrence of event T−N, from the probability 120A, which reflects the occurrence of event T−N. A positive difference value indicates that the occurrence of event T−N makes the target outcome more likely, while a negative difference value indicates that the occurrence of event T−N makes the target outcome less likely. The absolute value of this difference indicates the strength of the influence of event T−N on the target outcome. In one example, an absolute value of 1 would indicate that event T−N is entirely determinative of the target outcome, while an absolute value of 0 would indicate that event T−N has no effect on the target outcome, with values between 0 and 1 representing a range of partial causality.

Thus, the disclosed pairwise comparison of the target outcome probabilities for a factual event sequence and its corresponding counter-factual event sequence enable the machine learning system 100A to determine the incremental value 130 of the event that differs between the factual and counter-factual sequences (here, event T−N). Although this example determines the incremental value of an event in the middle of the sequence, the factual/counter-factual comparison can be performed for any event in the sequence (e.g., the first event, the last event, or any intervening event).

Figure 1B:
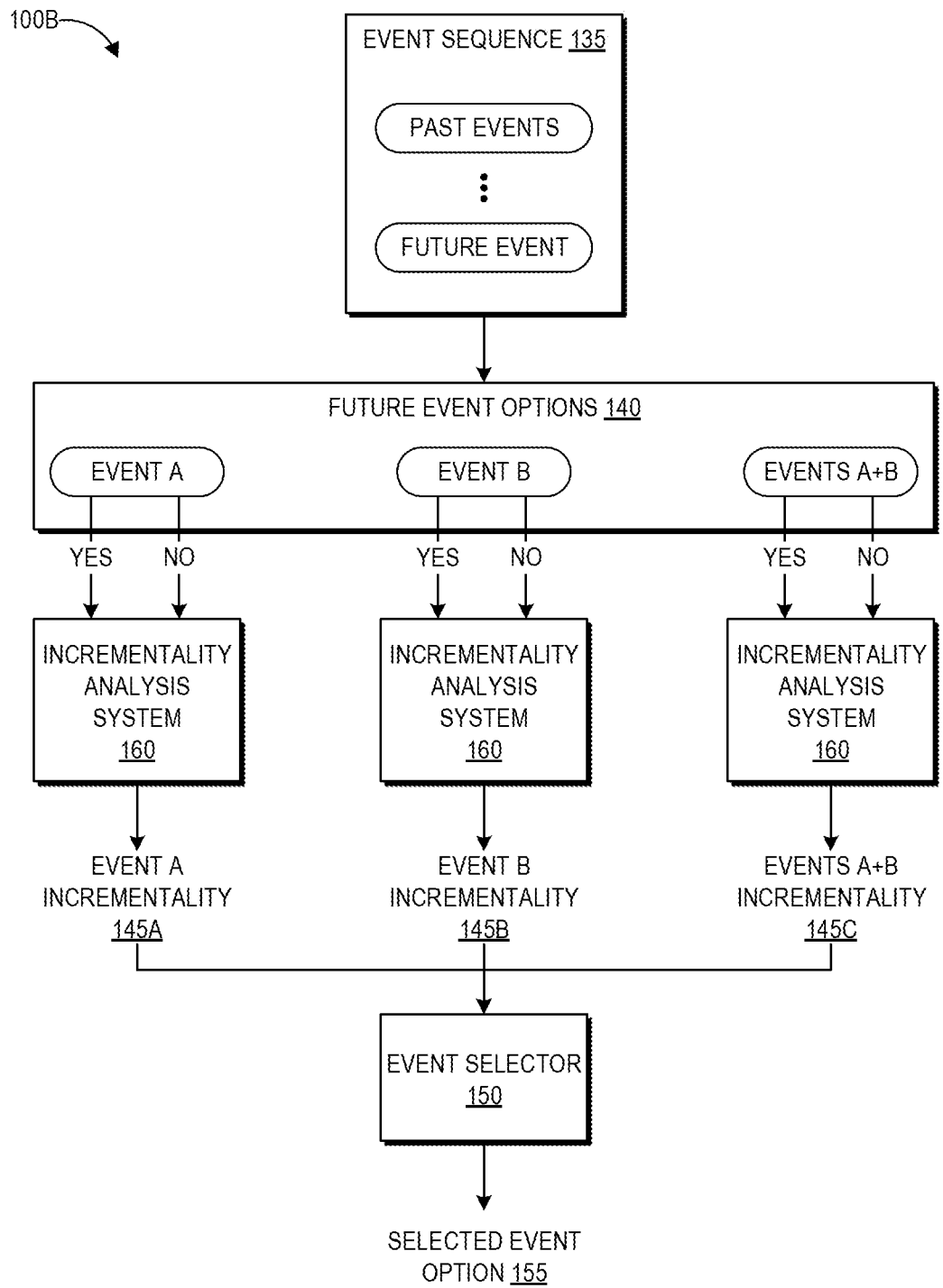
FIG. 1B is a schematic diagram of an embodiment of a machine learning sequence analysis system for the incremental impact of a future event in a chain of events, according to the present disclosure.

FIG. 1B is a schematic diagram of an embodiment of a machine learning sequence analysis system 100B for the incremental impact of a future event in a chain of events, according to the present disclosure. Here, the incrementality analysis system 160 is applied to evaluate a number of potential future event options 140, represented as events A, B, and a combination of A and B. Specifically, an event sequence 135 includes a number of past events and a future event. Events A, B, and A+B are considered as candidates for this future event. For example, featurized representation of the past events can be input into the event incrementality analyzer 115 in combination with individual featurized representations of events A, B, and A+B. As indicated by the "yes" arrows, each event option is featurized as if it has happened and provided into the incrementality analysis system 160. As indicated by the "no" arrows, each event option is also featurized as if it has not happened and provided into the incrementality analysis system 160. As described with respect to FIG. 1A, this yields the isolated incrementality of each event option (or event option combination). Specifically, combining the past events with event A and comparing the resulting factual and counterfactual representation probabilities yields event A incrementality 145A, combining the past events with event B and comparing the resulting factual and counterfactual representation probabilities yields event B incrementality 145B, and combining the past events with events A+B and comparing the resulting factual and counterfactual representation probabilities yields event A+B incrementality 145C.

These event incrementalities 145A-145C are compared by the event selector 150. In implementations in which occurrence the target outcome is desired (e.g., a user performing a high value action), the event selector 150 can select the event A, B, or A+B that yields the highest incrementality. In implementations in which occurrence of the target outcome is not desired (e.g., predictions of negative outcomes such as users returning items, users leaving the electronic catalog, etc.), the event selector 150 can select the event A, B, or A+B that yields the lowest incrementality. A selected event can refer, in some embodiments, to a particular marketing program that will be presented to a user.

Although FIG. 1B depicts the example of comparing three future event options 140, the disclosed incrementality analysis can be applied to option sets including any number of two or more event options.

Figure 2A:
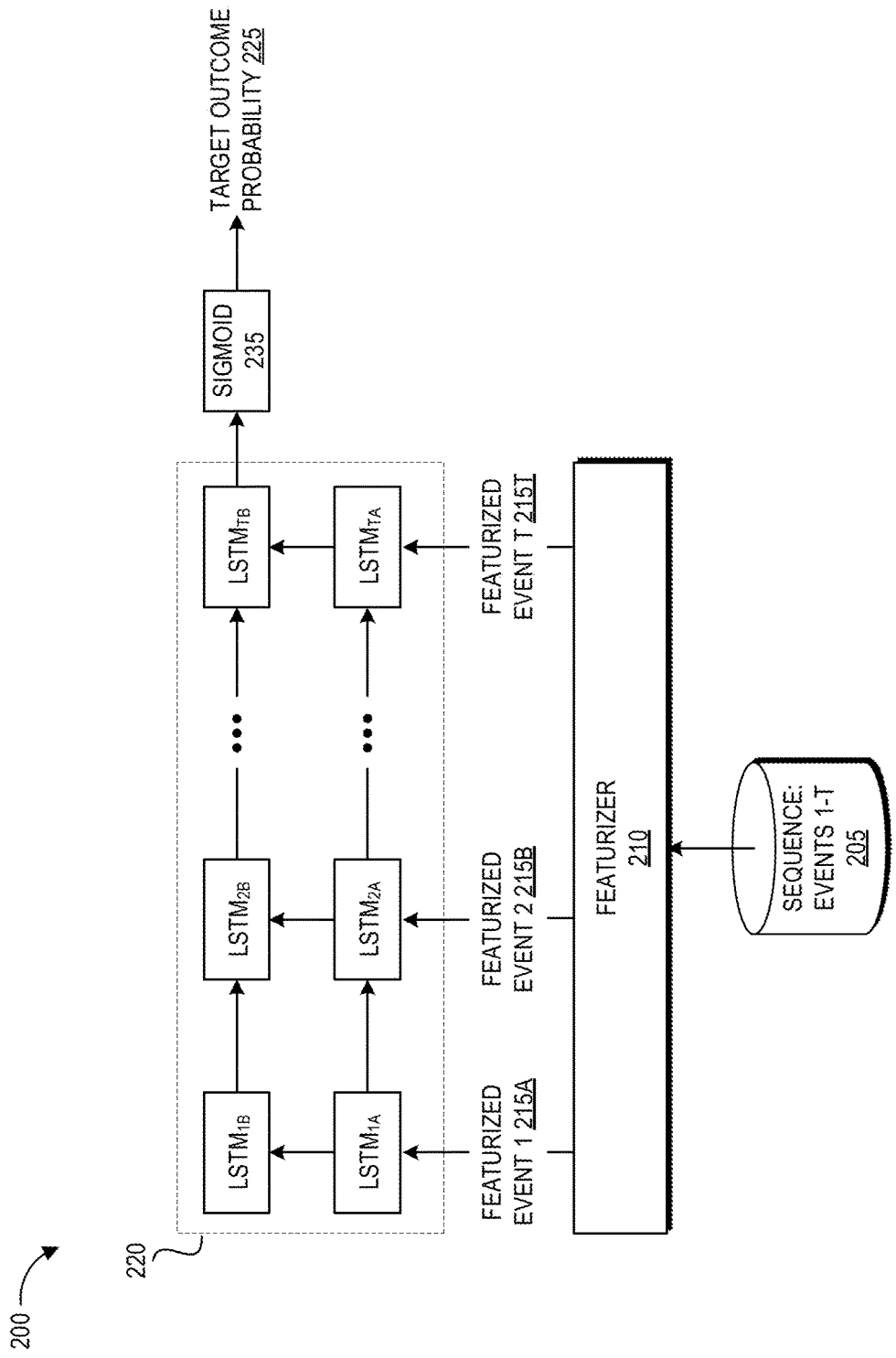
FIGS. 2A-2B illustrate block diagrams of an example machine learning system that can be trained to provide the incremental impact evaluations of FIGS. 1A and 1B.
Figure 2B:
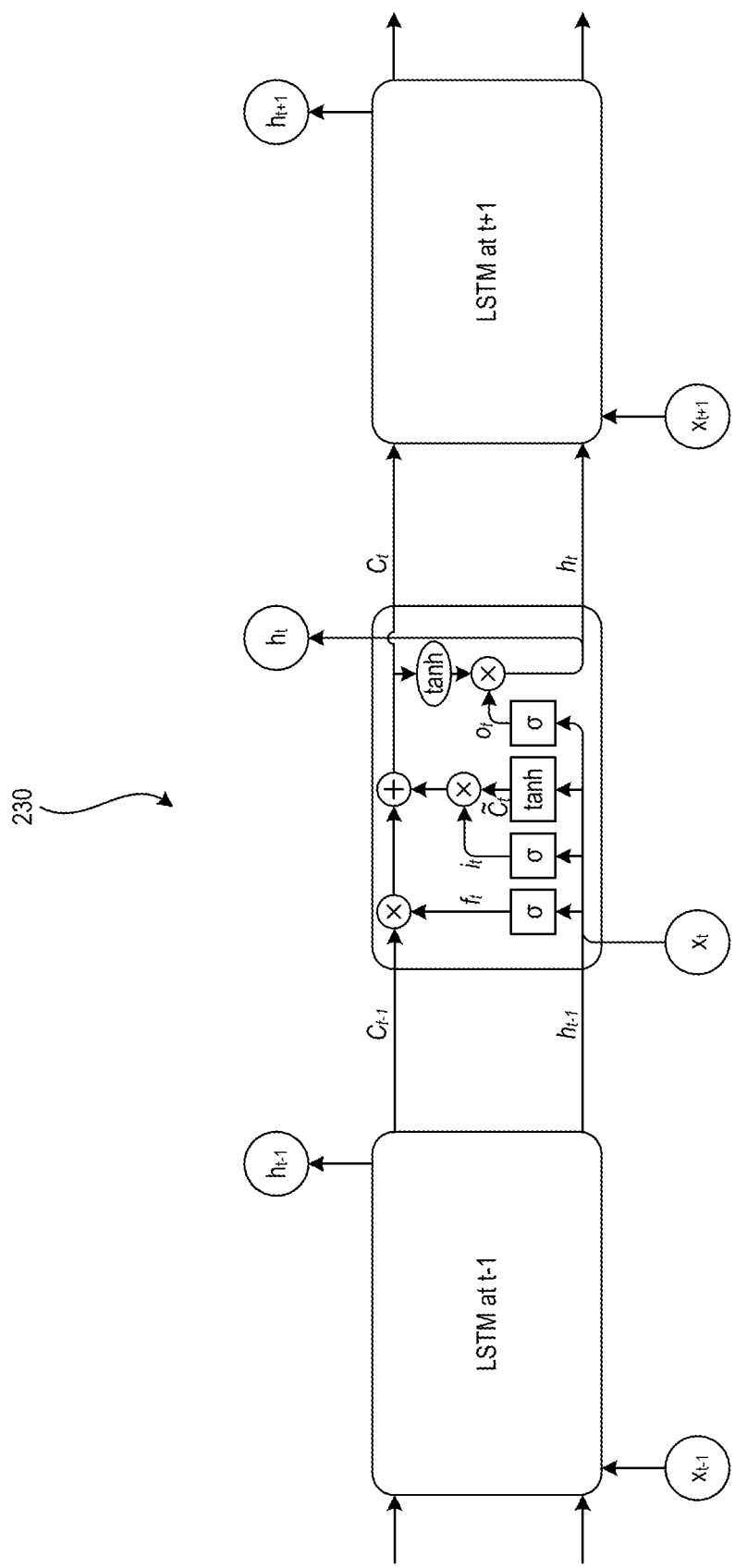

FIGS. 2A-2B illustrate block diagrams of an example machine learning system 200 that can be trained to provide the incremental impact evaluations described above with respect to FIGS. 1A and 1B. For example, the machine learning system 200 can be used as the event incrementality analyzer 115 of FIGS. 1A and 1B. By way of its learned parameters and computational structure, described in more detail below, the machine learning system 200 can take input data representing a sequence of events and can output a target outcome probability 225 representing a probability that a target outcome will occur.

Specifically, FIG. 2A depicts an example machine learning system 200 including a featurizer 210 and a LSTM network 220 that analyzes a sequence of events 1−T. In some implementations, the sequence of events can be constrained to a particular window of time, for example two weeks (or more or less, depending upon the prediction requirements). As described above, one example application of this machine learning system 200 is for determining the incremental impact of different marketing programs on desired user actions. In such embodiments, each of events 1−T may be a "transit" to the electronic catalog from another source, such as an associate traffic channel, electronic message, or search engine. Each transit can be represented by one or more of the traffic channel through which it occurs, the originating platform (e.g., a particular external domain), impressions or interactions with on-site programs, total transit duration (e.g., how long the user stays on the electronic catalog after transiting), the number of item detail pages viewed during the transit, the categories of items browsed during the transit, and the day of the week, to name several examples.

Data representing the sequence of events can be featurized, here represented by the data repository 205 storing information about a chain of events 1 through T, featurizer 210, and the featurized event 1 215A, featurized event 2 215B, and featurized event T 215T. A "featurization" is a transformation of some data representing an event into a computer-readable representation of the nature, meaning, context, and/or characteristics of that event. Here, each event can be separately featurized to generate a representation of the event for input into the LSTM network 220. As described above with respect to FIG. 1A, in some embodiments a particular event may be featurized in a first manner to indicate that the event happened and additionally featurized in a second manner to indicate that the event did not happen. Featurization provides a numerical value of data that describes the properties of that data, and can be performed through one hot encodings, bag of words techniques, term frequency—inverse document frequency techniques, or other suitable numerical conversion techniques.

As noted above, the LSTM network 220 is a type of RNN. Generally, neural networks can be used to model complex relationships between inputs and outputs and to find patterns in data, where the dependency between the inputs and the outputs cannot be easily ascertained. A neural network typically includes an input layer, one or more hidden layers, and an output layer, with each layer including a number of nodes. The number of nodes can vary between layers. A neural network is typically considered "deep" when it has two or more hidden layers. The input layer can have as many nodes as needed to intake the numerical representations of value of the pixels of the image (e.g., eight nodes per pixel if a pixel is represented by eight bits). In one example the neural network is a fully connected neural network, that is, each node in the input layer is connected to each node in the first hidden layer, each node in the first hidden layer is connected in turn to each node in the subsequent layer, and so on until each node in the final hidden layer is connected each node in the node in the output layer. Other implementations may have varying connection structures, for example the directional connection structure illustrated for the LSTM network 220.

The weights of these connections are learned from data during the training process, for example through backpropagation in which the network parameters are tuned to produce expected outputs given corresponding inputs in labeled training data. Thus, the artificial neural network is an adaptive system that is configured to change its structure (e.g., the connection configuration and/or weights) based on information that flows through the network during training, and the weights (e.g., parameters) of the hidden layers can be considered as an encoding of meaningful patterns in the data.

The featurized representations of the different events are each input into respective memory blocks (labeled as LSTM) of the LSTM network 220. In implementations that operate on transit data, each transit can be used for a different step of the LSTM. This "quantization" can offer the level of granularity that facilitates the disclosed incremental impact attribution. The incremental impact of a particular transit can represent the likelihood that a user will take a desired action at each transit.

As illustrated, the LSTM network 220 includes a number of LSTM memory blocks. An LSTM memory block includes of a memory cell and three multiplicative gates which regulate the state of the cell. The memory cell encodes the knowledge of the inputs that have been observed up to that time step, a forget gate controls whether the old information should be retained or forgotten, an input gate regulates whether new information should be added to the cell state, and an output gate controls the flow of the cell state to the output. LSTM networks are made deep by stacking multiple such memory blocks. In the illustrated embodiment, each event has two associated LSTM blocks depicted in a column above that event. This can be equated with the LSTM network 220 having two "layers" of memory blocks, with each layer forming a number of columns corresponding to the number of events. The structure of the LSTM network 220 may be dynamic to accommodate different numbers of events in a sequence, or in alternate embodiments the structure of the LSTM network 220 may be fixed and input data can be standardized to include a predetermined number of events corresponding to the number of columns in the LSTM network 220. Though shown with two LSTM block layers, the LSTM network 220 can include three or more layers of LSTM blocks in other implementations.

Data flows through the LSTM network 220 by moving upward through the layers along each column and by moving forward along a layer across the columns.

Forward here refers to data flowing in a direction moving from the column of the first event 1 towards the column of the last event T. Thus, the output of an LSTM block is potentially provided to two other LSTM blocks, one in the same column but in a higher layer and one in the same layer but in the adjacent column (in the forward direction). It will be appreciated that LSTM blocks in the upper layer and in the final column (the column of event T) provide their output vectors to only one other LSTM block. The LSTM blocks in the upper layer (e.g., the layer furthest from the input of the event representation) pass their output vectors forward to one adjacent LSTM block in that same layer.

The LSTM blocks in the final column pass their output vectors upward to one LSTM block in the next layer along the column. The final block of the LSTM network 220—the block in the highest layer and the final column, shown here as $LSTM_{TB}$—thus receives two input vectors that collectively reflect calculations performed in all columns and all layers of the LSTM network 220, and the output of this final block is the output of the LSTM network 220.

To illustrate the flow of data through the LSTM network 220, the featurized event 1 representation 215A is fed through $LSTM_{1A}$ and the output of $LSTM_{1A}$ is provided to $LSTM_{1B}$. Similarly, the featurized event 2 representation 215B is fed through $LSTM_{2A}$ and the output of $LSTM_{2A}$ is provided to $LSTM_{2B}$, and so on through event T. Further, the LSTM blocks share information with adjacent LSTM blocks in the same layer. For example, the output of $LSTM_{1A}$ is provided to $LSTM_{2A}$, the output of $LSTM_{1B}$ is provided to $LSTM_{2B}$, and so on. The output obtained from the LSTM network 220 at the last time step, $LSTM_{TB}$, is provided into the sigmoid function 235 which scales its value between 0 and 1 to generate the target outcome probability 225. As such, the target outcome probability 225 reflects the cumulative analysis of each event in the sequence and also accounts for the order of the events in the sequence, due to the flow of data through the LSTM network 220.

At each iteration of either training or inference of the machine learning system 200, the LSTM network 220 computes the functions within the LSTM memory blocks to generate new cell state and output scores. These new cell state and output scores are transmitted to subsequent iterations of the LSTM memory cells to be used in the computation of functions within the LSTM memory cells in subsequent time steps, as well as passed to LSTM blocks in the next layer and/or adjacent column of LSTM blocks. The new cell state and output scores that are passed to the LSTM memory cells for the next time step retains information on the input vectors of the previous time step, and thus, the LSTM is trained to associate output vectors with the input vectors.

FIG. 2B depicts further details of an example of LSTM memory block 230 that can be used with the LSTM network 220 of FIG. 2A. FIG. 2B illustrates one example of how an LSTM memory cell can use the cell state and output score to allow information in previous time steps to persist and be used in its current computation. LSTM memory cells are a type of RNN, and as such they form networks with "loops" in them that allow information to persist from use to use. A RNN (and LSTM) can be thought of as multiple copies of the same network, each passing a message to a successor. To illustrate this concept, FIG. 2B illustrates the same LSTM memory block 230 at time t as well as this same cell at times t−1 and t+1.

The example LSTM memory block 230 receives the output cell state $C_{t-1}$ and output vector hidden state $h_{t-1}$ from itself at a previous time step, thus retaining values of prior states. The example LSTM memory block 230 also receives input $x_t$, which represents either an input featurized event representation or the output of a different LSTM memory cell in the LSTM network 220.

The cell state, represented by the horizontal line running through the top of the LSTM memory cell 230 in FIG. 2B, can be considered as the memory of the LSTM that allows information to be stored in the LSTM across periods of time. The cell state encodes, at every time step, knowledge of inputs that have been observed up to that step.

Information can flow along the cell state unchanged, though the LSTM memory block 230 does have the ability to remove or add information to the cell state, regulated by structures called gates. The LSTM memory block 230 includes a forget gate $f_t$, an input gate it, and an output gate $o_t$. The forget gate $f_t$ determines whether the current content of the cell state will be forgotten or erased, the input gate it determines whether the input $x_t$ will be stored in the cell state, and the output gate $o_t$ determines whether current cell state contents will be output.

The forget gate $f_t$ is a sigmoid (sigmoidal non-linearity) layer, and its output values determine how long data remains in the LSTM memory block 230 by specifying how much of the cell state and output vector from the previous iteration of the LSTM memory block 230 will be used to influence the current cell state. The forget gate $f_t$ can maintain information within the LSTM memory block 230 for short or long periods of time, or time steps. The value of the forget gate $f_t$ can be calculated as $f_t=\sigma(h_{t-1}*x_t)$.

The input gate it is a sigmoid layer, and its output values represent a determination of an amount (e.g., percentage) of the input that will be processed by the LSTM memory block 230. The sigmoid layer of the input gate controls how much of the cell state and output scores of previous time steps will be used in the LSTM memory cell computation. The value of the input gate it can be calculated as $i_t=\sigma(h_{t-1}*x_t)$.

The tan h (hyperbolic tangent non-linearity) layer creates a vector of new candidate values, $\tilde{c}_t$, that could be added to the state. The candidate state value $\tilde{c}_t$ can be calculated as $\tilde{c}_t=\tan h(h_{t-1}*x_t)$. The tan h layer can apply a hyperbolic tangent function that pushes the values of $h_{t-1}*x_t$ between −1 and 1.

The output gate $o_t$ is a sigmoid layer, and its output values determine how much of the processed information will be outputted from the LSTM memory block 230. Specifically, the sigmoid values of the output gate control how much of the output vector will be output from the LSTM memory block 230. The output gate $o_t$ can be calculated as $o_t=\sigma(h_{t-1}*x_t)$.

The above-described calculations are used to update the old cell state $C_{t-1}$ into the new cell state $C_t$. The new cell state $C_t$ can be determined as $C_t=i_t*\tilde{C}_t+f_t*C_{t-1}$. The new cell state $C_t$ is output to a future iteration of the LSTM memory block 230.

The new cell state $C_t$ is also put through another tan h layer (to push the values to be between −1 and 1) and then multiplied by the output of the sigmoid gate. The new output vector $h_t$ for the LSTM memory block 230 can thus be determined as $h_t=o_t*\tan h(C_t)$. The new output vector $h_t$ for the LSTM memory block 230 is passed to the next LSTM block(s) in the LSTM network 220 (e.g., the next block in the column corresponding to an event, the adjacent block in a row/layer) or output as the target outcome probability 225 if the LSTM memory block 230 is the final memory block in the LSTM network 220.

Returning to the example illustrating the flow of data through the LSTM network 220, the featurized representation 215A of event 1 is fed into $LSTM_{1,A}$, as $x_t$. The hidden state output $h_t$ of $LSTM_{1,A}$ is provided as the $x_t$ input to $LSTM_{1,B}$ and as the $x_t$ input to $LSTM_{2,A}$. As such, the $LSTM_{2,A}$ memory block receives two inputs (in addition to previous cell state $C_{t-1}$ and hidden state $h_{t-1}$ inputs from a previous iteration of itself). In one embodiment, these can be concatenated into a single input $x_t$ and then processed through the gates of $LSTM_{2,A}$ as described with respect to FIG. 2B. In another embodiment, the two inputs can be processed separately through an LSTM block using different weights, where these different weights are learned separately during training.

To continue the illustration, consider that the $LSTM_{2,A}$ memory block receives the hidden state representation $h_t$ of block $LSTM_{1,A}$ and the input featurized representation 215B of event 2. Block $LSTM_{2,A}$ can process the hidden state representation $h_t$ of block $LSTM_{1,A}$ using a first set of weights and can separately process the featurized representation 215B of event 2 using a second set of weights, with the first and second sets of weights learned during the training process. For block $LSTM_{1,A}$, which does not receive a hidden state representation output from a different block, the block can still be configured to process two inputs but can set the input hidden state representation to zero. This can apply to the other blocks in the column corresponding to event 1 as well. As such, the parameters of the LSTM network 220 can include two sets of weights for each block.

Thus, the three gates of the LSTM memory block 230 (input gate $i_t$, forget gate $f_t$, output gate $o_t$) can each include a sigmoid layer and a multiplication operation. These sigmoid layers can be used as described above to control the gates. For example, a sigmoid layer outputs a number between zero and one for each number in the input vector. These output values can control a gate by acting as weights that determine whether to allow the full, part, or none of the corresponding vector value to pass when multiplied by the corresponding vector value. Thus, the output of the gates can range from allowing nothing (sigmoid layer value is 0 and thus the input to the multiplication operation is multiplied with 0) to everything (sigmoid layer value is 1 and thus the input to the multiplication operation is multiplied with 1). As described herein, these LSTM weights can be learned via training of the machine learning model 200.

Other variations on the illustrated LSTM architecture can also be used within the LSTM network 220. For example, one variation can use coupled forget and input gates.

Another variation can add "peephole connections" that allow the gate layers to access information from the cell state. Another variation is the gated recurrent unit (GRU) that combines the forget and input gates into a single "update gate" and also merges the cell state and hidden state, among other changes. In addition, other types of RNN architectures can be used in place of the LSTM network in other implementations.

Overview of Example Execution Environment

Figure 3:
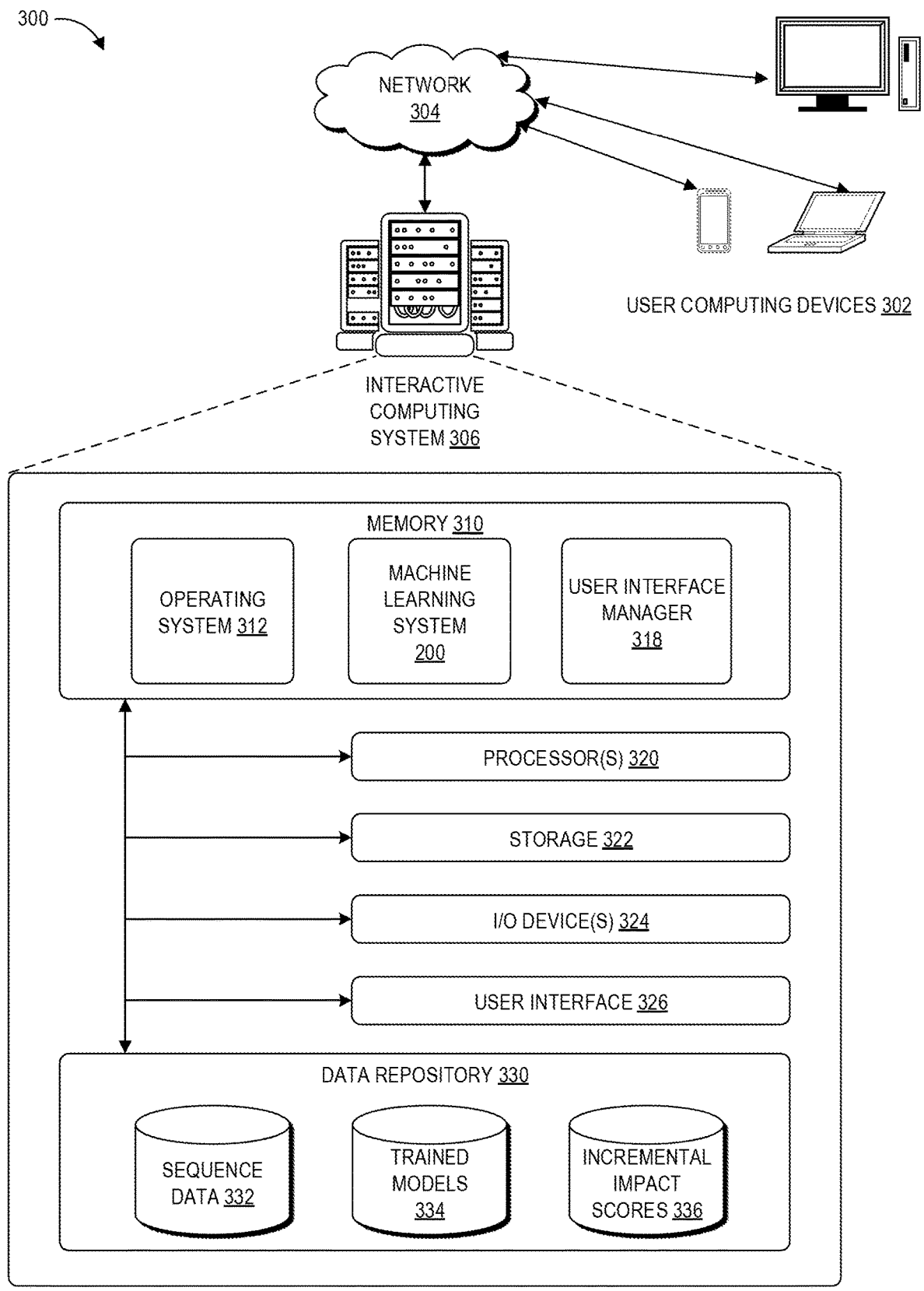
FIG. 3 illustrates a schematic block diagram of an illustrative operating environment in which an interactive computing system provides incremental impact evaluations, for example using the machine learning system of FIGS. 2A-2B.

FIG. 3 illustrates a schematic block diagram of an illustrative operating environment 300 in which an interactive computing system 306, for example including the machine learning system 200, provides programmatic incremental impact analysis for input event sequences.

The interactive computing system 306 can communicate over network 304 with user devices 302. The network 304 can include any appropriate network, including an intranet, the Internet, a cellular network, a local area network or any other such network or combination thereof. User devices 302 can include any network-equipped computing device, for example desktop computers, laptops, smartphones, tablets, e-readers, gaming consoles, and the like. Users can access the interactive computing system 306 and interact with items therein via the network 304 and can be provided with content via the network 304. As used herein, the term "item," in addition to having its ordinary meaning, is used interchangeably to refer to an item itself (e.g., a particular product) and to its description or representation in a computer system or electronic catalog. As will be apparent from the context in which it is used, the term may also sometimes be used herein to refer only to the item itself or only to its representation in a computer system.

The interactive computing system 306 may include one or more computers, perhaps arranged in a cluster of servers or as a server farm. The memory and processors that make up these computers may be located within one computer or distributed throughout many computers (including computers that are remote from one another) as detailed herein. These servers may be configured to train and use value imputation models and manage searches and recommendations. For example, the interactive computing system 306 may be configured to manage marketing programs offered in connection with an electronic marketplace.

The interactive computing system 306 may include at least one memory 310 and one or more processing units (or processor(s)) 320. The memory 310 may include more than one memory and may be distributed throughout the interactive computing system 306. The memory 310 may store program instructions that are loadable and executable on the processor(s) 320 as well as data generated during the execution of these programs. Depending on the configuration and type of memory, the memory 310 may be volatile (such as random access memory ("RAM")) and/or non-volatile (such as read-only memory ("ROM"), flash memory, or other memory). In some examples, the memory 310 may include multiple different types of memory, such as static random access memory ("SRAM"), dynamic random access memory ("DRAM"), or ROM.

The memory 310 can store the program instructions as a number of modules that configure processor(s) 320 to perform the various functions described herein, for example operating system 312 for interacting with the computing system 300, as well as the machine learning system 200 and user interface manager 318, which can be in direct communication with one another or distributed among computing devices within a networked computing system and in communication with each other. One example of the machine learning system 200 can include an LSTM network 220 as described above, however other suitable sequence analysis networks may be used in other implementations. In addition, the machine learning system 200 can include computer-executable instructions regarding training the network parameters. The user interface manager 318 can configure a user interface for display of events (e.g., particular content items) that are identified as having a desired incremental impact towards a target outcome by the machine learning system 200.

The processor 320 may include one or more general purpose computers, dedicated microprocessors, graphics processors, or other processing devices capable of communicating electronic information. Examples of the processor 320 include one or more application-specific integrated circuits ("ASICs"), graphical processing units ("GPUs"), field programmable gate arrays ("FPGAs"), digital signal processors ("DSPs") and any other suitable specific or general-purpose processors. The processor 320 may be implemented as appropriate in hardware, firmware, or combinations thereof with computer-executable instructions and/or software. Computer-executable instructions and software may include computer-executable or machine-executable instructions written in any suitable programming language to perform the various functions described.

In some examples, the interactive computing system 306 may also include additional storage 322, which may include removable storage and/or non-removable storage. The additional storage 322 may include, but is not limited to, magnetic storage, optical disks, and/or solid-state storage. The disk drives and their associated computer-readable media may provide non-volatile storage of computer-readable instructions, data structures, program modules, and other data for the computing devices. The memory 310 and the additional storage 322, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules, engines, and components, may refer to programming modules executed by computing systems (e.g., processors) that are part of the architecture.

The interactive computing system 306 may also include input/output (I/O) device(s) and/or ports 324, such as for enabling connection with a keyboard, a mouse, a pen, a voice input device, a touch input device, a display, speakers, a printer, or other I/O device. The interactive computing system 306 may also include a user interface 326. The user interface 326 may be utilized by a user to access portions of the interactive computing system. In some examples, the user interface 326 may include a graphical user interface, web-based applications, programmatic interfaces such as application programming interfaces (APIs), or other user interface configurations. The user interface 326 can include displays of content events as described herein. In some embodiments, the I/O device(s) and/or ports 324 and user interface 326 can be part of a user computing device accessing interactive computing system 306 via network 304.

The interactive computing system 306 also includes a data store 330. In some examples, the data store 330 may include one or more data stores, databases, data structures, or the like for storing and/or retaining information associated with the computing system 300. Thus, the data store 330 may include data structures, such as sequence data repository 332, trained models data repository 334, and incremental impact scores data repository 336. These each comprise one or more physical data storage devices storing the designated data. The sequence data repository 332 can store data representing the events in a number of sequences, with such data including the properties of the events needed for featurization. The trained models data repository 334 can store the parameters and structures of trained models for use in identifying the incremental impact of particular events in a sequence. The incremental impact scores data repository 336 can store individual or aggregate incremental impact scores for particular events. For example, the incremental impact of specific marketing programs can be analyzed across a user base of an electronic catalog in order to determine their value, and these values can be stored in the incremental impact scores data repository 336 for use in determining which marketing programs to use and how to price the marketing programs. This analysis may be confined to a particular user segment, for example analyzing the incremental impact of a shoe-related marketing program on users who have expressed interest in shoes. In some implementations, the incremental impact of specific events can be pre-generated and stored in the incremental impact scores data repository 336 for use in real-time decisions about what content to expose to certain users.

Overview of Example Incremental impact Analysis Training and Inference

Figure 4A:
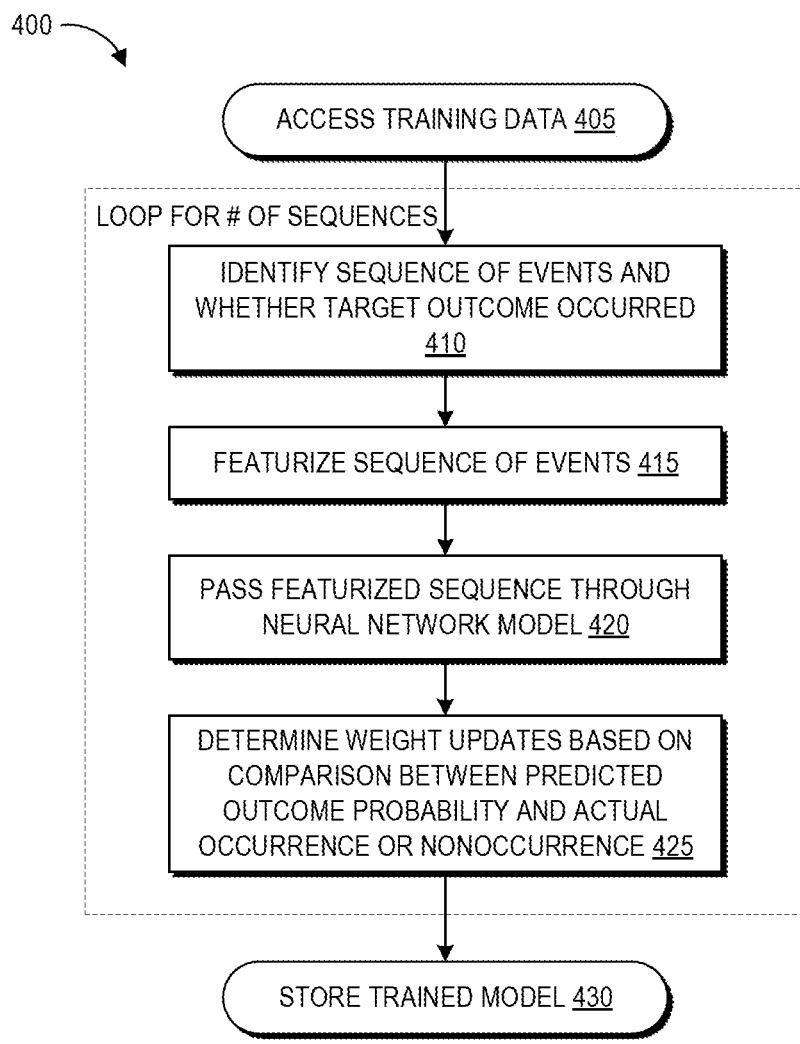
FIG. 4A is a flow diagram depicting an illustrative embodiment of a process that may be implemented for training the machine learning system of FIGS. 2A-2B for evaluating incremental impact.

FIG. 4A is a flow diagram depicting an illustrative embodiment of a process 400 that may be implemented for training the machine learning system 200 for evaluating incremental impact. The process 400 is described in the context of evaluating whether particular transits of users to an electronic catalog yield desired actions from the users, however as described herein the incremental value analysis can be applied in a wide variety of contexts. Generally speaking, the process 400 can involve collecting data representing event sequences and the subsequent occurrence or non-occurrence of a target outcome, and training the machine learning system 200 to predict the likelihood that the target outcome will occur after a given event sequence.

Figure 4B:
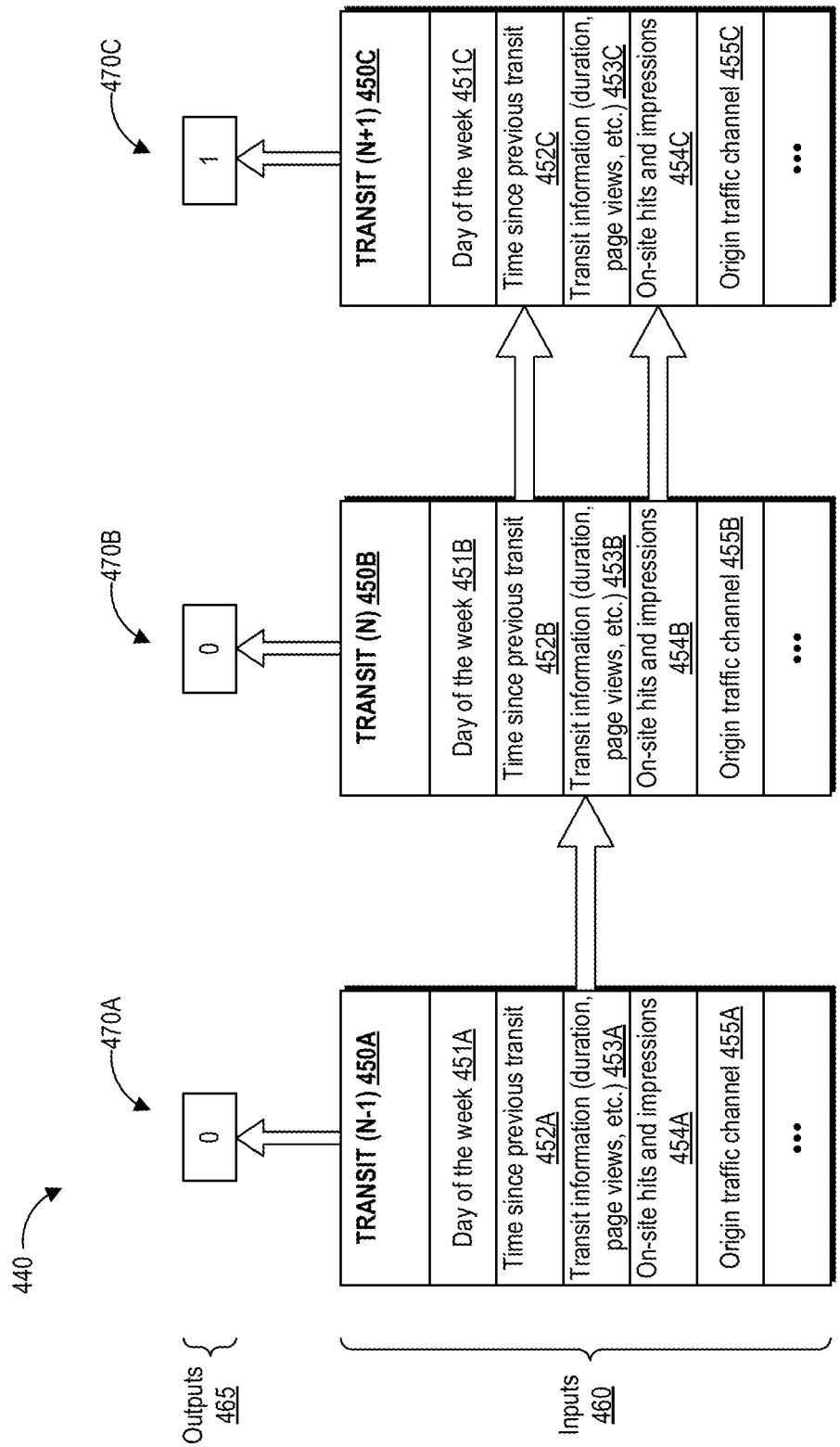
FIG. 4B is a graphical depiction of transit data that can represent training data for the process of FIG. 4A.

At block 405, the machine learning system 200 accesses training data. FIG. 4B is a graphical depiction of transit data that can represent training data 440 for the process of FIG. 4A. As shown in FIG. 4B, inputs 460 include information representing a number of transits 450A, 450B, 450C. Each transit can be represented by a number of parameters including the day of the week 451A, 451B, 451C, the time since the previous transit 452A, 452B, 452C, properties of the transit 453A, 453B, 453C (including the duration, any item detail pages viewed, and the like), on-site hits and impressions 454A, 454B, 454C (e.g., hits and impressions of marketing content presented in the electronic catalog), and origin traffic channel 455A, 455B, 455C, among others. In this example, use of the trained network can determine the incremental value of any piece of transit information such as the origin traffic channel and specific on-site marketing content, as described in further detail with respect to FIGS. 5 and 6.

The training data 440 also includes outputs 465, here represented by "0" indicating that the target outcome did not occur during a given transit or by "1" indicating that the target outcome did occur during a given transit, though other values can be used in other implementations. The target outcome can be a high value action such as purchase, membership subscription, or other user actions that yield value for the electronic catalog. As such, the machine learning model 200 can be trained to recognize the likelihood of the target outcome from a given event sequence. In use, the output represents the likelihood that the target outcome will occur during a given transit. For example, the probability 470A may be 0.09, the probability 470B can be 0.14, and the probability 470C can be 0.16, which can reveal the incremental "lift" or increase in likelihood due to transits N 450B and N+1 450C.

Returning to discussion of FIG. 4A, at block 410 the machine learning system 200 can identify a particular sequence of transits in the training data and can also identify whether the target outcome occurred at each transit. At block 415 the machine learning system 200 can featurize each event in the sequence. For example, in the implementation depicted in FIG. 4B, each of the transit parameters (the day of the week, the time since the previous transit, properties of the transit, on-site hits and impressions, and origin traffic channel) can be separately featurized in order to generate a numerical representation of the transit properties. During training, the featurization can correspond to the actual facts of the transit, rather than the counter-factual simulations described herein.

At block 420 the machine learning system 200 can pass the featurized sequence through a neural network model 420. For example, as described above with respect to FIGS. 2A and 2B, the featurized representation of each transit can be input into a separate LSTM block, with the LSTM blocks passing information to one another in a direction corresponding to the chronological sequence of the transits (e.g., an LSTM block processing information about transit N–1 can pass its output to an LSTM block processing information about transit N which occurs after transit N–1, but not vice versa).

At block 425, the machine learning system 200 can compare the output probability to the value representing whether the target outcome actually occurred. For this purpose, the machine learning system 200 may only use the actual probability 470C of the final event in the sequence (although the sequence can be modified to remove later events and the system 200 trained using the actual outcome of earlier events). Any deviation can be back propagated through the LSTM network 220 to determine updates to its parameters (e.g., its learned weights) that increase the correspondence between the output probability to the actual target outcome. As indicated by the dashed box around blocks 410-425 can be repeated for each of a number of sequences in the training data. When training is complete, at block 430 the trained model can be stored, for example in the trained models data repository 334.

Figure 5:
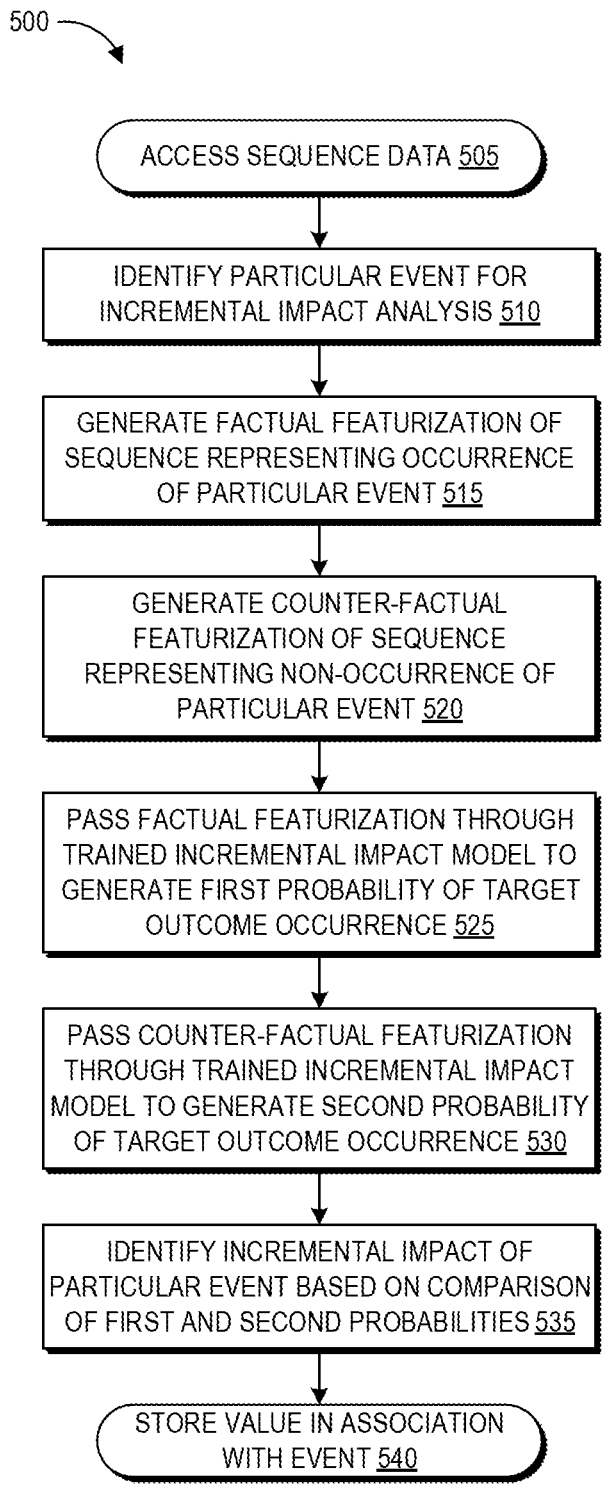
FIG. 5 is a flow diagram depicting an illustrative embodiment of a process for using a machine learning system, trained according to the process of FIG. 4A, to identify the incremental impact of a past event in a chain of events, for example as illustrated in FIG. 1A.

FIG. 5 is a flow diagram depicting an illustrative embodiment of a process 500 for using a machine learning system, trained according to the process of FIG. 4A, to identify the incremental impact of a past event in a chain of events, for example as illustrated in FIG. 1A. As described herein, the incremental impact of the past event can be used to assess its effectiveness for ranking it compared to other events, establishing pricing of the event, and understanding the value of the event (e.g., to determine whether continued efforts should go into supporting the event). It will be appreciated that the particular event may be a single event or a combination of events, as described with respect to FIG. 1B, At block 505, the machine learning system 200 can access sequence data representing a chain of past events that occurred. For example, the machine learning system 200 can access transit data as illustrated in FIG. 4B. At block 510 the machine learning system 200 can identify a particular event for incremental impact analysis. For example, the machine learning system 200 may be provided with data indicating one or more marketing programs (e.g., external traffic channels or on-site marketing content) for evaluation, and can analyze the sequence data to locate one of the indicated marketing programs in the sequence data.

At block 515, the machine learning system 200 can generate a factual featurization of the sequence representing the occurrence of the particular event. The factual featurization corresponds to the actual recorded sequence, in that it reflects that the particular event did occur. Conversely, at block 520 the machine learning system can generate a counter-factual featurization of the sequence representing that the particular event did not occur. The counter-factual featurization corresponds to the factual featurization, with the exception that the particular event is represented as having not occurred.

At block 525, the machine learning system 200 can pass the factual featurization through the trained incremental impact model to generate a first probability of the target outcome occurring with the sequence including the particular event. Similarly, at bock 530 the machine learning system 200 can pass the counter-factual featurization through the trained incremental impact model to generate a second probability of the target outcome occurring without the sequence including the particular event.

At block 535, the machine learning system 200 can identify the incremental impact of the particular event on the target outcome based on a comparison of the first and second probabilities. For example, the machine learning system 200 may subtract the second probability, which reflects the non-occurrence of the event, from the first probability, which reflects the occurrence of the event. A positive difference value can indicate that the occurrence of the event makes the target outcome more likely, while a negative difference value can indicate that the occurrence of the event makes the target outcome less likely. The absolute value of this difference can indicate the strength or magnitude of the influence of the event on the target outcome.

At block 540, the incremental impact value can be stored in association with the event. The incremental impact value can be analyzed in the aggregate with other incremental pact values for the event that were determined based on other sequences, in order to obtain a more generalized understanding of the incremental impact of the event.

Figure 6:
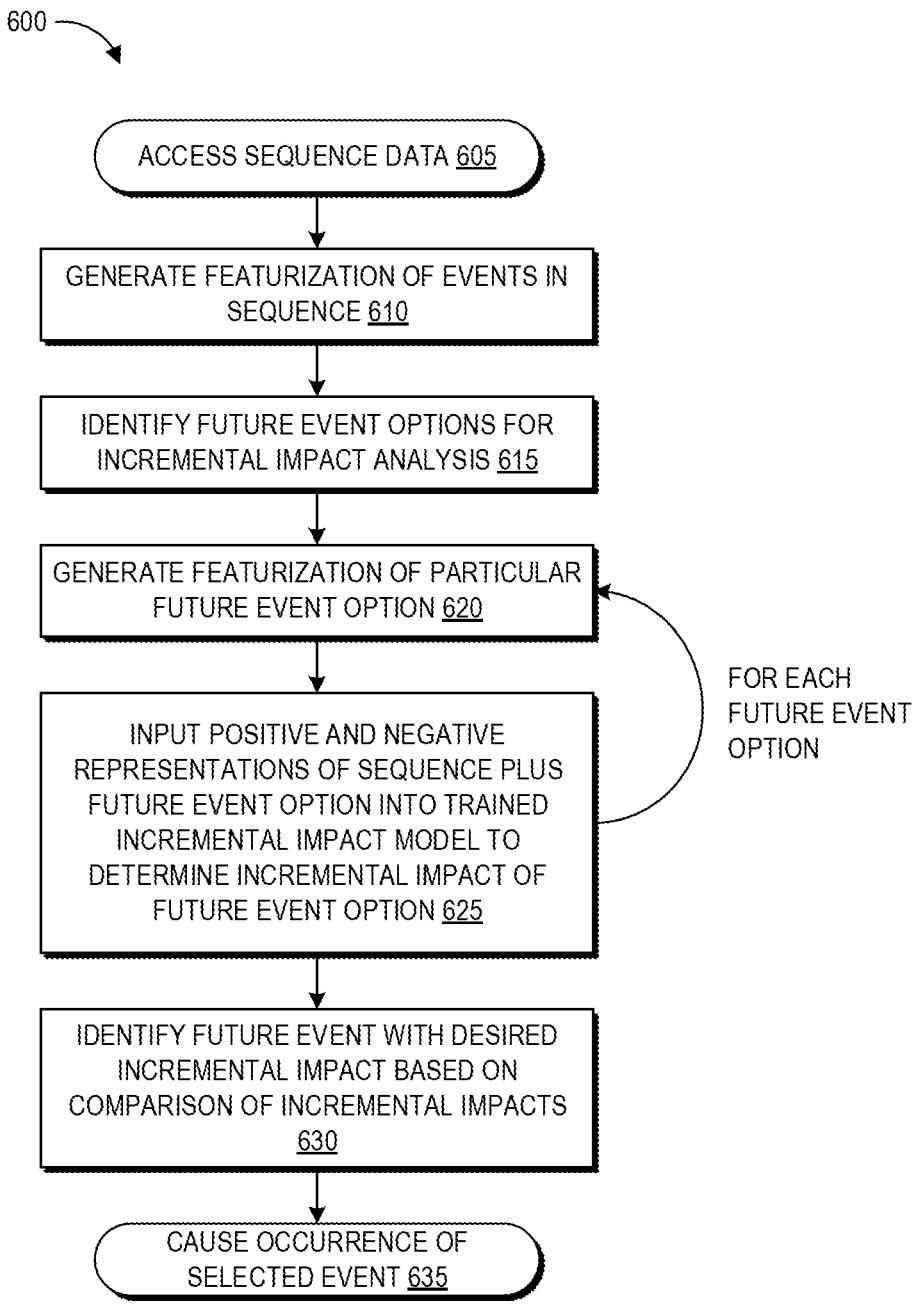
FIG. 6 is a flow diagram depicting an illustrative embodiment of a process for using a machine learning system, trained according to the process of FIG. 4A, to identify the incremental impact of a future event in a chain of events, for example as illustrated in FIG. 1B.

FIG. 6 is a flow diagram depicting an illustrative embodiment of a process 600 for using a machine learning system, trained according to the process of FIG. 4A, to identify the incremental impact of a future event in a chain of events, for example as illustrated in FIG. 1B.

At block 605, the machine learning system 200 can access sequence data representing a chain of past events that occurred. For example, the machine learning system 200 can access transit data as illustrated in FIG. 4B. In some contexts, the sequence can be obtained in real time (e.g., as a user is navigating the electronic catalog), such that a last event in the sequence reflects a current transit of the user. At block 610, this event sequence can be featurized as described herein.

At block 615, the machine learning system 200 can identify future event options for incremental impact analysis. For example, the machine learning system 200 can identify a number of options of onsite marketing content that could be presented to the user during this current transit. Next, at block 615, the machine learning system 200 generates a featurization of a particular future event option. For example, the featurization of the current transit can be modified to indicate that the particular future event option has already occurred. In other implementations, the particular future event option can be featurized as its own event. As such, the featurization is counter-factual, in that it represents the occurrence of a yet-to-happen future event.

At block 625, two counter-factual featurizations relating to each particular event, one representing that the event happened after the sequence and another representing that the event did not happen after the sequence, can be input into a trained incremental impact analysis model to determine the incremental impact of particular event, for example as described with respect to FIG. 1B. Specifically, featurizations of previous events in the sequence can be input into a first set of blocks of the LSTM network 220, while the featurization representing the particular future event option can be input into the last block $LSTM_{T4}$ of the input layer of the LSTM network 220.

As indicated by the loop from block 625 back to block 620, these blocks can be repeated for each future event option. This generates an incremental impact for each event option, each based on a comparison of probabilities yielded from analyzing counter-factual simulations of the sequence including a different one of the future events or not including the future event, as described with respect to FIG. 1B.

At block 630, the machine learning system 200 can identify which future event option has the desired incremental impact based on comparison of these determined values. For example, if occurrence of the target outcome is desired (e.g., a user performing a desired action), then the event option that yields the highest incremental impact can be selected. Conversely, if occurrence of the target outcome is not desired (e.g., a user leaving the electronic catalog), then the event option that yields the lowest incremental impact can be selected. In some implementations, multiple versions of the machine learning system 200 can be run in parallel using the same featurizations in order to predict the incrementality of a number of different outcome options.

At block 635, the machine learning system 200 can cause occurrence of the selected event (or output a recommendation regarding the selected event, if it is not possible for the machine learning system 200 to proactively cause it). For example, the machine learning system 200 can generate and transmit instructions that cause a user device to present the selected onsite marketing content to the user.

As the user continues their exploration of the electronic catalog, the process 600 can be repeated using updated information about user behavior to determine the parameters of the current transit. For example, the selected marketing content can be represented in the transit parameters as an impression if the user viewed the marketing content without taking any action, or as a hit if the user viewed the marketing content and also acted on it. At each step of the user's journey, a next onsite marketing content to show to the user can be selected based on maximizing the likelihood of the user performing the desired action (e.g., making a purchase or rental, streaming or downloading digital content, or otherwise acquiring an item represented in the electronic catalog).

Beneficially, the same trained machine learning system can be used to perform the process 500 for determining the incremental impact of a past event on a target outcome, and for performing the process 600 for determining which future event will maximize the probability of the target outcome. Accordingly, one implementation can involve training the machine learning model 200 according to the process 400 to predict the likelihood of a certain outcome, loading a first instance of the trained model into memory to determine the incremental impact of a past event on that outcome, and loading a second instance of the trained model into memory to identify which future event option will maximize the probability of that outcome occurring (or not occurring, depending upon the implementation).

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A process for measuring an incremental impact of a particular event on a likelihood of a target outcome occurring in a network-accessible system that hosts interactive content, the process comprising, under control of program instructions executed by one or more processors:

generating and storing event sequence data representing event sequences occurring in interactive browsing sessions of each of a plurality of users of the network-accessible system, wherein a target outcome occurs in some, but not all, of the event sequences;

training a machine learning model to use an event sequence to predict a likelihood of the target outcome occurring, wherein training the machine learning model comprises providing representations of the event sequences to the machine learning model, including event sequences in which the target outcome occurs and event sequences in which the target outcome does not occur, wherein the machine learning model generates target outcome predictions based on the representations of the event sequences, and wherein training the machine learning model further comprises updating weights of the machine learning model based on comparisons between said predictions and whether the target outcome actually occurs; and subsequently, using the trained machine learning model to measure said incremental impact by at least:
determining a factual event sequence representing an interactive browsing session of a particular user of the network-accessible system, said factual event sequence including said particular event, said particular event comprising an impression of a content item during the interactive browsing session;
generating a counterfactual event sequence by modifying the factual event sequence to remove the particular event;
processing a representation of the factual event sequence with the trained machine learning model to generate a first probability that the factual event sequence will result in the target outcome occurring, wherein processing the representation of the factual event sequence comprises applying the weights of the trained machine learning model to the representation of the factual event sequence;
processing a representation of the counterfactual event sequence with the trained machine learning model to generate a second probability that the counterfactual event sequence will result in the target outcome occurring, wherein processing the representation of the counterfactual event sequence comprises applying the weights of the trained machine learning model to the representation of the counterfactual event sequence; and
determining a difference between the first and second probabilities, said difference representing said incremental impact of the particular event on the likelihood of the target outcome occurring;

wherein the process comprises using the trained machine learning model to measure said incremental impact in real time during the interactive browsing session of the particular user.

2. The process of claim 1, wherein the machine learning model is a neural network.

3. The process of claim 2, wherein neural network comprises a long short-term memory network.

4. The process of claim 3, wherein the process further comprises processing a portion of the representation of the factual event sequence with a particular long short-term memory block in an input layer of the long short-term memory network, said portion corresponding to the particular event.

5. The process of claim 1, further comprising selecting, based on said difference, content to provide to the particular user during the interactive browsing session.

6. The process of claim 1, wherein the representation of the factual event sequence is a featurization of the factual event sequence, said featurization comprising numerical values indicating whether particular events occurred during the interactive browsing session.

7. The process of claim 1, wherein processing a representation of the factual event sequence with the trained machine learning model comprises processing featurized representations of different events with different respective memory blocks of a long short-term memory network.

8. A system comprising:
an electronic data repository that stores data logged from interactive browsing sessions of users, the data representing event sequences, including event sequences in which a target outcome occurs and event sequences in which the target outcome does not occur; and
a computing system comprising one or more computing devices programmed with executable program instructions, the computing system programmed to determine an incremental impact of a particular event on a likelihood of the target outcome occurring by a process that comprises:
training a machine learning model to use an event sequence to predict a likelihood of the target outcome occurring, wherein training the machine learning model comprises providing representations of said event sequences to the machine learning model, including the event sequences in which the target outcome occurs and the event sequences in which the target outcome does not occur, wherein the machine learning model generates target outcome predictions based on the representations of the event sequences, and wherein training the machine learning model further comprises updating weights of the machine learning model based on comparisons between said predictions and whether the target outcome actually occurs; and
subsequently, using the trained machine learning model to measure said incremental impact by at least:
determining a factual event sequence representing an interactive browsing session of a particular user, said factual event sequence including said particular event, said particular event comprising an impression of a content item during the interactive browsing session;
generating a counterfactual event sequence by modifying the factual event sequence to remove the particular event;
processing a representation of the factual event sequence with the trained machine learning model to generate a first probability that the factual event sequence will result in the target outcome occurring, wherein processing the representation of the factual event sequence comprises applying the weights of the trained machine learning model to the representation of the factual event sequence;
processing a representation of the counterfactual event sequence with the trained machine learning model to generate a second probability that the counterfactual event sequence will result in the target outcome occurring, wherein processing the representation of the counterfactual event sequence comprises applying the weights of the trained machine learning model to the representation of the counterfactual event sequence; and determining a difference between the first and second probabilities, said difference representing said incremental impact;

wherein the process comprises using the trained machine learning model to measure said incremental impact in real time during the interactive browsing session of the particular user.

9. The system of claim 8, wherein the machine learning model is a neural network.

10. The system of claim 9, wherein neural network comprises a long short-term memory network.

11. The system of claim 10, wherein the process further comprises processing a portion of the representation of the factual event sequence with a particular long short-term memory block in an input layer of the long short-term memory network, said portion corresponding to the particular event.

12. The system of claim 8, wherein the process further comprises selecting, based on said difference, content to provide to the particular user during the interactive browsing session.

13. The system of claim 8, wherein the representation of the factual event sequence is a featurization of the factual event sequence, said featurization comprising numerical values indicating whether particular events occurred during the interactive browsing session.

14. The system of claim 8, wherein processing a representation of the factual event sequence with the trained machine learning model comprises processing featurized representations of different events with respective memory blocks of a long short-term memory network.

15. Non-transitory computer storage comprising a non-transitory computer-readable medium, the non-transitory computer storage storing executable program instructions that direct a computing system comprising one or more computing devices to perform a process that comprises:

generating and storing event sequence data representing event sequences occurring in interactive browsing sessions of each of a plurality of users of a network-accessible system, wherein a target outcome occurs in some, but not all, of the event sequences;

training a machine learning model to use an event sequence to predict a likelihood of the target outcome occurring, wherein training the machine learning model comprises providing representations of the event sequences to the machine learning model, including event sequences in which the target outcome occurs and event sequences in which the target outcome does not occur, wherein the machine learning model generates target outcome predictions based on the representations of the event sequences, and wherein training the machine learning model further comprises updating weights of the machine learning model based on comparisons between said predictions and whether the target outcome actually occurs; and subsequently, using the trained machine learning model to measure said incremental impact by at least:

determining a factual event sequence representing an interactive browsing session of a particular user of the network-accessible system, said factual event sequence including said particular event, said particular event comprising an impression of a content item during the interactive browsing session;

generating, from the factual event sequence, a counterfactual event sequence in which the particular event is omitted;

processing a representation of the factual event sequence with the trained machine learning model to generate a first probability that the factual event sequence will result in the target outcome occurring, wherein processing the representation of the factual event sequence comprises applying the weights of the trained machine learning model to the representation of the factual event sequence;

processing a representation of the counterfactual event sequence with the trained machine learning model to generate a second probability that the counterfactual event sequence will result in the target outcome occurring, wherein processing the representation of the counterfactual event sequence comprises applying the weights of the trained machine learning model to the representation of the counterfactual event sequence; and determining a difference between the first and second probabilities, said difference representing said incremental impact of the particular event on the likelihood of the target outcome occurring;

wherein the process comprises using the trained machine learning model to measure said incremental impact in real time during the interactive browsing session of the particular user.

16. The non-transitory computer storage of claim 15, wherein the machine learning model is a neural network.

17. The non-transitory computer storage of claim 16, wherein neural network comprises a long short-term memory network.

18. The non-transitory computer storage of claim 17, wherein the process further comprises processing a portion of the representation of the factual event sequence with a particular long short-term memory block in an input layer of the long short-term memory network, said portion corresponding to the particular event.

19. A process for measuring an incremental impact of a particular event on a likelihood of a target outcome occurring in a network-accessible system that hosts interactive content, the process comprising, under control of program instructions executed by one or more processors:

generating and storing event sequence data representing event sequences occurring in interactive browsing sessions of each of a plurality of users of the network-accessible system, wherein a target outcome occurs in some, but not all, of the event sequences;

training a machine learning model to use an event sequence to predict a likelihood of the target outcome occurring, wherein training the machine learning model comprises providing representations of the event sequences to the machine learning model, including event sequences in which the target outcome occurs and event sequences in which the target outcome does not occur, wherein the machine learning model generates target outcome predictions based on the representations of the event sequences, and wherein training the machine learning model further comprises updating weights of the machine learning model based on comparisons between said predictions and whether the target outcome actually occurs; and subsequently, using the trained machine learning model to measure said incremental impact by at least:

determining a factual event sequence representing an interactive browsing session of a particular user of the network-accessible system, said factual event sequence including said particular event, said particular event comprising an impression of a content item during the interactive browsing session;

generating a counterfactual event sequence by modifying the factual event sequence to remove the particular event;

processing a representation of the factual event sequence with the trained machine learning model to generate a first probability that the factual event sequence will result in the target outcome occurring, wherein processing the representation of the factual event sequence comprises applying the weights of the trained machine learning model to the representation of the factual event sequence;

processing a representation of the counterfactual event sequence with the trained machine learning model to generate a second probability that the counterfactual event sequence will result in the target outcome occurring, wherein processing the representation of the counterfactual event sequence comprises applying the weights of the trained machine learning model to the representation of the counterfactual event sequence; and determining a difference between the first and second probabilities, said difference representing said incremental impact of the particular event on the likelihood of the target outcome occurring;

wherein the factual event sequence is obtained in real time during the interactive browsing session as the particular user navigates an electronic catalog, and the process further comprises selecting, based at least partly on said incremental impact, content to present to the particular user during the interactive browsing session.

* * * * *